United States Patent
Arunachalam et al.

(10) Patent No.: US 12,332,730 B2
(45) Date of Patent: Jun. 17, 2025

(54) ERROR CONTEXT FOR BOT OPTIMIZATION

(71) Applicant: Cisco Technology, Inc., San Jose, CA (US)

(72) Inventors: Chidambaram Arunachalam, Apex, NC (US); Nagendra Kumar Nainar, Morrisville, NC (US); Gonzalo Salgueiro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 234 days.

(21) Appl. No.: 17/963,478

(22) Filed: Oct. 11, 2022

(65) Prior Publication Data

US 2024/0118960 A1    Apr. 11, 2024

(51) Int. Cl.
| | |
|---|---|
| *G10L 15/00* | (2013.01) |
| *G06F 3/16* | (2006.01) |
| *G06F 11/07* | (2006.01) |
| *G06F 40/35* | (2020.01) |
| *G10L 15/01* | (2013.01) |
| *G10L 15/22* | (2006.01) |

(52) U.S. Cl.
CPC .......... *G06F 11/0769* (2013.01); *G06F 3/165* (2013.01); *G06F 11/0736* (2013.01); *G06F 40/35* (2020.01); *G10L 15/01* (2013.01); *G10L 15/22* (2013.01); *G10L 2015/228* (2013.01)

(58) Field of Classification Search
CPC .......... G10L 15/16; G10L 15/22; G06F 40/35
See application file for complete search history.

(56) References Cited

U.S. PATENT DOCUMENTS

| | | | |
|---|---|---|---|
| 9,304,796 B1* | 4/2016 | Douglas | G06F 11/0712 |
| 9,818,400 B2 | 11/2017 | Paulik et al. | |
| 11,294,752 B2* | 4/2022 | Vaughn | G06F 40/253 |
| 11,966,820 B2* | 4/2024 | Ghatage | G06F 11/3006 |
| 2014/0297268 A1 | 10/2014 | Govrin et al. | |
| 2017/0277993 A1 | 9/2017 | Beaver et al. | |
| 2017/0330077 A1 | 11/2017 | Williams et al. | |
| 2018/0315415 A1* | 11/2018 | Mosley | G10L 15/063 |
| 2019/0304446 A1 | 10/2019 | Scavo et al. | |
| 2020/0379836 A1* | 12/2020 | Vaughn | G06F 11/0787 |
| 2020/0382450 A1* | 12/2020 | Vaughn | H04L 51/02 |
| 2021/0217416 A1 | 7/2021 | Nadimpalli et al. | |
| 2022/0255885 A1* | 8/2022 | Aharoni | G10L 15/22 |

FOREIGN PATENT DOCUMENTS

JP    6740162 B2    8/2020

* cited by examiner

*Primary Examiner* — Daniel Abebe
(74) *Attorney, Agent, or Firm* — BEHMKE INNOVATION GROUP LLC; James M. Behmke

(57) ABSTRACT

In one embodiment, an illustrative method herein may comprise: obtaining, by a device, a plurality of indications of errors experienced by a bot performing tasks, wherein each of the plurality of indications includes contextual information of a corresponding error; determining, by the device, correlated errors among the errors experienced by the bot; aggregating, by the device, contextual information of each of the correlated errors into aggregated contextual data; and providing, by the device, the aggregated contextual data with an error notification for a particular correlated error.

20 Claims, 7 Drawing Sheets

ERROR CONTEXT FOR BOT OPTIMIZATION

TECHNICAL FIELD

The present disclosure relates generally to computer systems, and, more particularly, to providing error context for bot optimization.

BACKGROUND

Bots play a vital role in enabling self-service experiences for customers, partners, employees, etc. Bots, such as virtual assistants, chatbots, etc., are now increasingly an integral part of business workflows. Everyday bots are utilized worldwide by vast numbers of users to perform countless tasks. Users can employ bots to realize significant productivity gains and/or achieve various organizational goals such as case deflection, call deflection, etc.

In their capacity as autonomous user interfaces, bots are expected to reliably accept user requests, infer an intent of those requests, and perform the tasks being requested. When a bot fails to appropriately infer an intent of a user's request or encounters other types of errors, it may fail to meet these expectations leading to productivity losses, frustration, and even abandonment of use.

Many bots operate by applying trained artificial intelligence models to user inputs. Identifying, understanding, and/or correcting the shortcoming in these models that lead to bot errors may be achieved by identifying and/or analyzing the errors themselves. As such, the ability to observe any real-time errors experienced by users during a bot interaction and taking timely action is critical to ensure the best customer experience. Unfortunately, even when bot errors are detected, data that might be helpful in identifying and understanding those errors is often not available for observation.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an illustrative method herein may comprise: obtaining, by a device, a plurality of indications of errors experienced by a bot performing tasks, wherein each of the plurality of indications includes contextual information of a corresponding error; determining, by the device, correlated errors among the errors experienced by the bot; aggregating, by the device, contextual information of each of the correlated errors into aggregated contextual data; and providing, by the device, the aggregated contextual data with an error notification for a particular correlated error.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
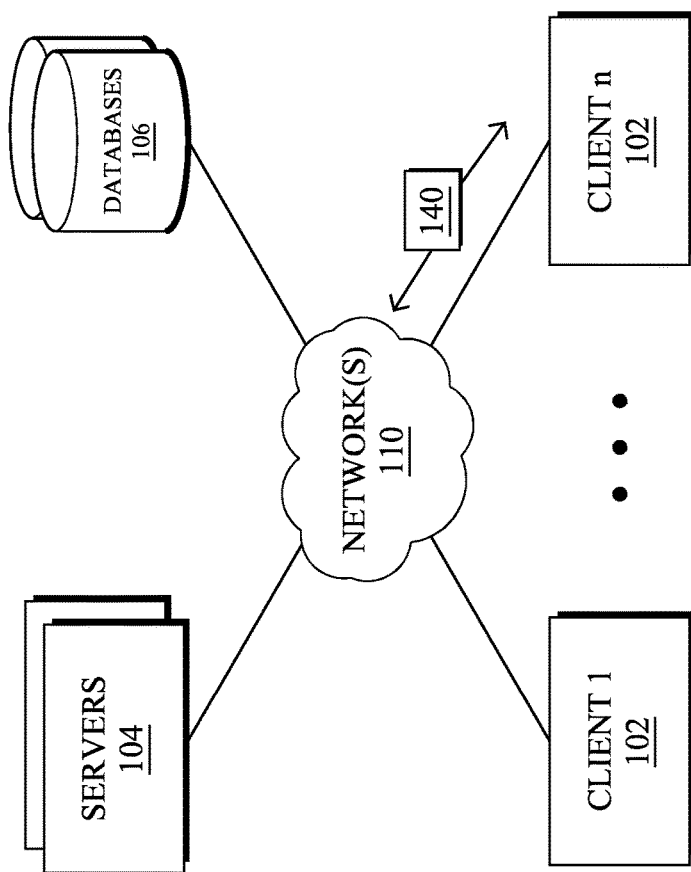
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
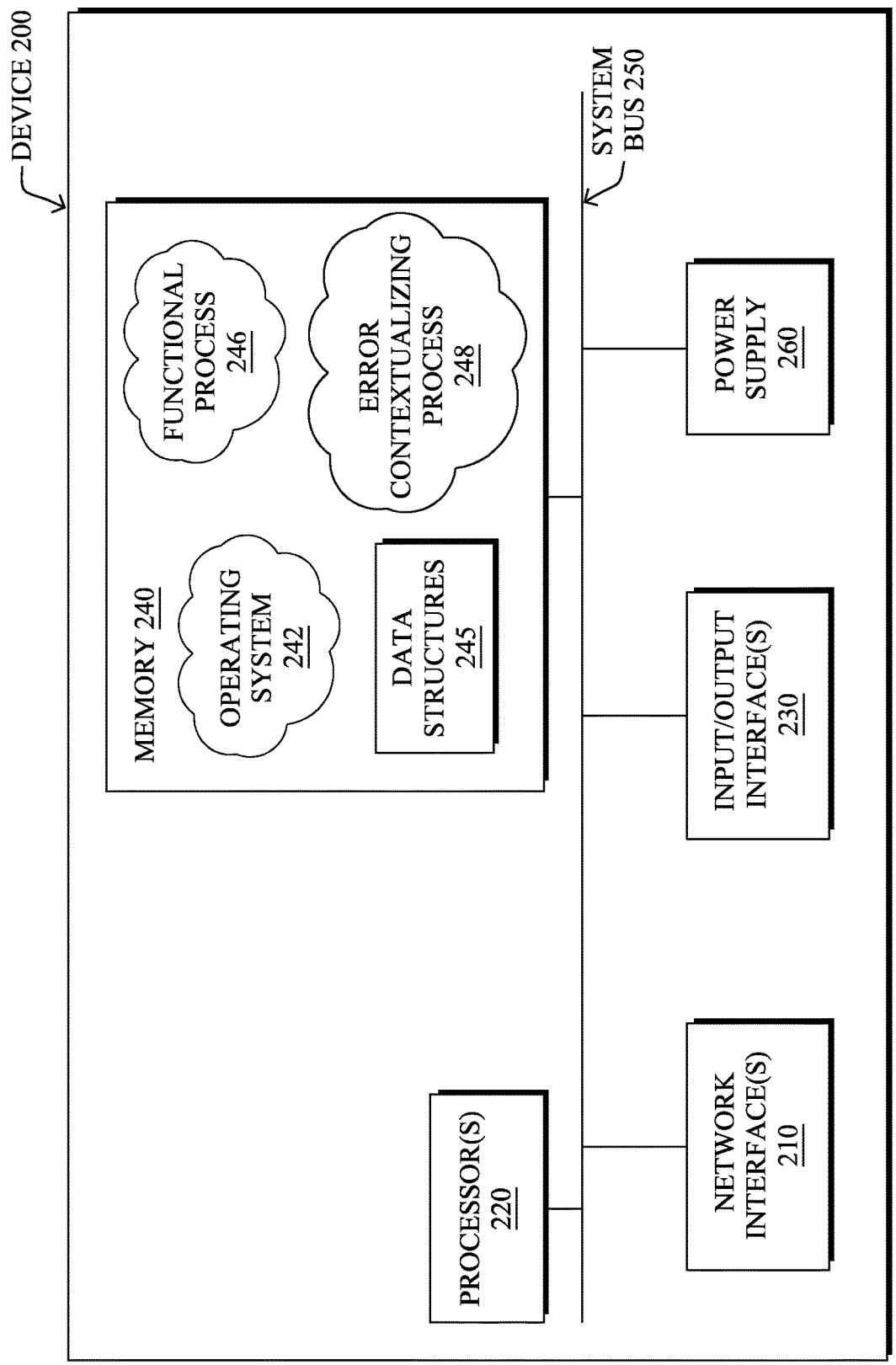
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "error contextualizing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
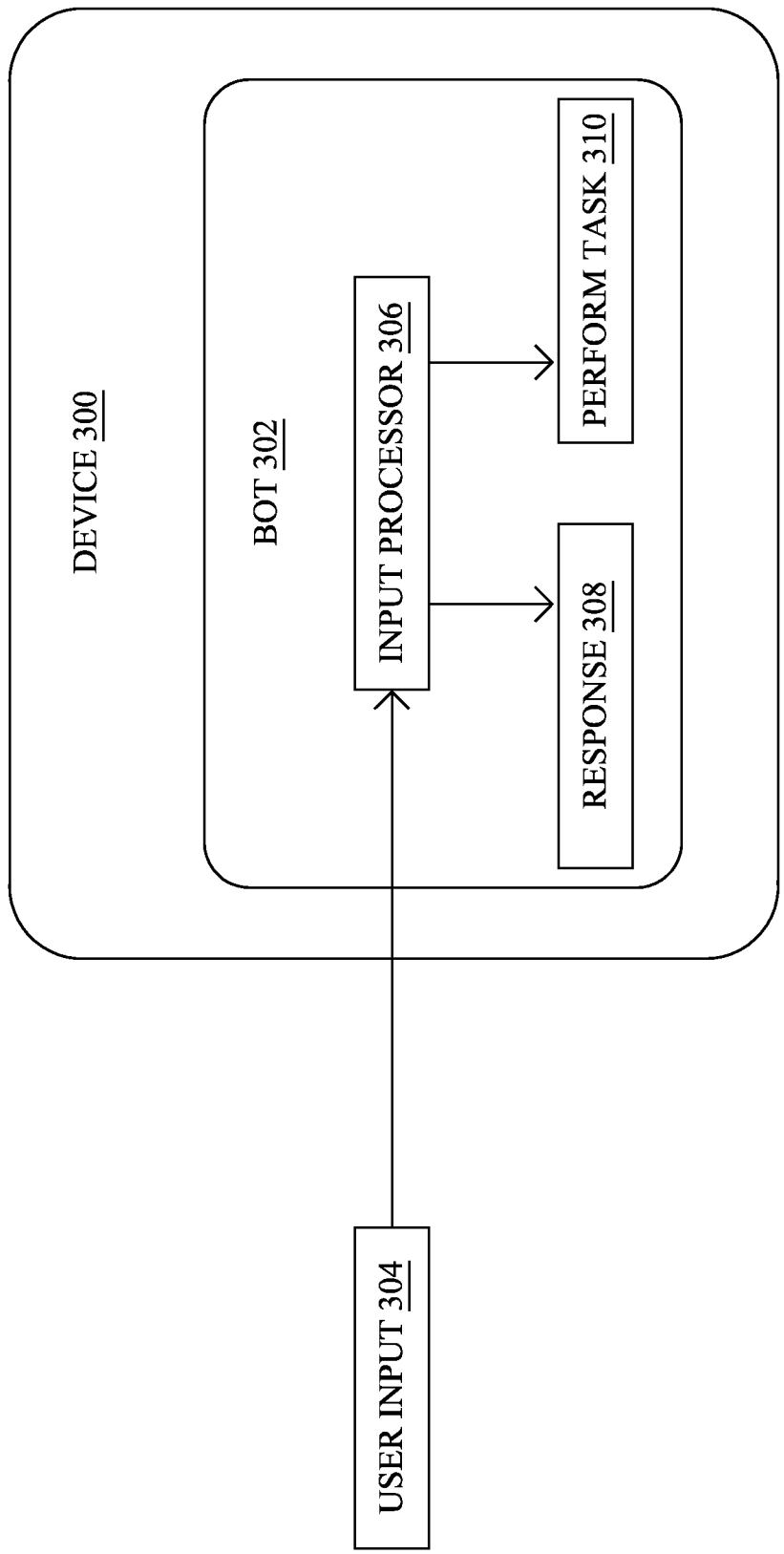
FIG. 3 illustrates an example bot operations on a device.

FIG. 3 illustrates a simplified schematic of bot operations on a device 300 according to various embodiments. Device 300 may include a computing device capable of storing and/or executing instructions to perform the various operations of bot 302. The device 300 may be a single device or a plurality of devices over which execution of the underlying processes of the operations of bot 302 are distributed.

In some examples, device 300 may be a client device. For example, the device 300 may belong to and/or be otherwise associated with a client or user of bot 302 and not owned or fully controlled by a provider (e.g., vendors, developers, support team, etc.) of bot 302. For example, device 300 may be a computer, IOT device, dedicated personal assistant device, smart phone, smart device, etc. belonging to and/or assigned to a user of bot 302. In such instances, some of the data on device 300 may be retained local to device 300 and not made available to and/or shared with a provider of bot 302. In other examples, however, device 300 may not be a client device. For example, device 300 may be a server or collection of servers configured to provide and interface to a user or a client device.

Bot 302 may include a computer program to autonomously interact with users and/or systems and perform tasks on their behalves. Bot 302 may be operable to simulate a human activity and/or act on behalf of a user as an agent. Bot 302 may identify and perform a task by inferring an intent of a user request (e.g., what task the user is asking to be completed, what a user means by the request, etc.) rather than by executing specific instructions for executing the task. For example, bot 302 may be a virtual assistant, a virtual chatbot, a virtual agent, a virtual advisor, virtual technical support, virtual customer service, etc. For instance, an example bot 302 may be a transcription service for a collaboration platform, such as for web conferences, video calls, and so on. Other examples may include chatbots for interacting with an online bank application, concierge services, online stores, and so on.

Bot 302 may operate using distributed computing and/or network communication. For example, bot 302 may process a user input 304 using the processing resources of device 300 and/or using processing resources of remote devices such as cloud and/or server-based bot services provided by a bot provider. These resources may be accessed over a data communication network (e.g., network 110).

Bot 302 may receive user input 304 from a user. User input 304 may include a request presented to bot 302 by speaking, typing, selecting, gesturing, etc. In some instances, user input 304 may be presented to bot 302 in a natural language format as though the user is requesting something from another human. User input 304 may be received by bot 302 via a microphone, a camera, a keyboard, a touchscreen, etc.

Bot 302 may process user input 304 at input processor 306. Processing user input 304 may include performing operations on and/or categorizations of the user input 304. The operations and/or categorizations may be performed in order to apply a logical understanding of user input 304. For example, input processor 306 may infer the intent of user input 304 and/or identify a task which is being requested by user input 304.

These and other operations of bot 302 may be supported by artificial intelligence mechanisms. For example, neural networks, machine learning techniques, etc. may be employed to process user input 304 and/or to determine its intent. For instance, input processor 306 may process user input 304 using language understanding models (e.g., a supervised, un-supervised, or semi-supervised model) to identify intent of user input 304. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like. In some examples, bot 302 may utilize natural language processing and/or natural language understanding to identify and/or understand the intent behind a user input 304 and to simulate human-like conversation with a user.

In some instances, bot 302 may generate response 308 when processing user input 304. Response 308 may include a conversational style reply. The reply may conversationally engage the user with a prompt to elicit additional input, seek clarification to an intent of user input 304, acknowledge receipt and/or processing of user input 304, etc.

Once bot 302 has identified an intent of user input 304 it may perform a requested task 310. Performing the requested task may include executing an operation that bot 302 has inferred as being requested by user input 304. For example, bot 302 may interface with a system such as a network or application monitoring service and may perform a task such as opening a trouble ticket, retrieving and/or providing troubleshooting guidance, providing metrics, etc. upon having inferred that task was requested in user input 304. Again, bot 302 may generate response 308 which may also include a conversational confirmation of task performance, a request for feedback on the task, a prompt for additional user inputs, etc. communicated to the user.

In some instances, bot 302 may encounter an error or otherwise be unable to successfully infer the intent of user input 304 or perform a requested task 310. An error may include an unintended failure of bot 302 to process, understand, act on, and/or successfully complete a task from user input 304. The error may include a full or partial misinterpretation or misunderstanding of user input 304 by bot 302 leading to a failure of bot 302 to perform a requested task 310. For example, bot 302 may be unable to understand the content and/or intent of user input 304. Some errors encountered by bot 302 may be a result of a failure of an underlying model used by bot 302 to understand and/or infer an intent of user input 304 and identify the tasks being requested. For example, a model being used by input processor 306 to process user input 304 may have insufficient training and/or incorrect training to successfully process speech from a user with a particular accent to infer the intent of that speech. In another example, the way in which language of a request in user input 304 is structured may not be recognized by the model used by bot 302. Of course, other errors are possible as well, such as problems with API calls and/or other errors that result in a failure of bot 302 to successfully perform requested operations.

However, the models used by bot 302 to identify the intent of user input 304 may be modified to improve the ability of input processor 306 to identify, understand, and/or act on an intent of a user input 304. For example, a model may be expanded or retrained so that a next time a user input 304 delivered in a particular accent or with a particular structure that previously caused an error is encountered, its intent may be successfully inferred and acted on by bot 302. The model may be improved by training the model with successful and/or unsuccessful outcomes from processing user input 304.

Successful (e.g., determined intent of request, successfully performed task, etc.) and/or unsuccessful (e.g., failed to determine the intent of request, failed to perform task, etc.) outcomes from processing user input and/or performing an associated task may be reported by bot 302 in a response 308. A response 308 indicating the outcome of processing a user input 304 may be communicated to a support team, monitoring software, etc. Therefore, a model may be improved by training it with a user input 304 with the context of response 308 generated by the bot 302 indicating the success and/or failure of the input processor 306 and/or task performance operations for that user input 304. For example, the model may be improved by refining it to correct for errors it has previously caused.

As noted above, the ability to observe the real-time errors experienced by users during the bot interaction and taking timely action is central to ensuring the best customer experience. Identifying and understanding these errors allows them to be rapidly addressed and resolved and for the models underlying bot function to be refined in order to prevent future errors of the same type.

Often, bot errors and their context are not able to be used to train models and/or inform error analysis. For example, bots frequently operate with and/or collect sensitive customer data. Sensitive data may include personally identifiable information (PII), private data, highly confidential data, financial data, healthcare data, purchase history, preference data, monetizable data, data useful in profiling a user, etc. This sensitive data may be data that most customers are not comfortable automatically or default sharing with a third party for model training purposes and/or may include data that is subject to regulations, laws, policies, etc. that restrict its sharing without explicit consent of the user. Therefore, the sensitive data is generally not retained by and/or shared by the bot in in a manner that is accessible for bot training purposes.

For example, a user may speak a request to bot associated with operations involving highly confidential customer data. An audio sample of the request may be processed at the bot in attempt to infer an intent of the request and/or a corresponding task to perform. However, that audio sample is not retained for, made accessible to, and/or used for training purposes.

Logically, without knowledge of an error, the error cannot be corrected. Moreover, with incomplete knowledge of an error, its recognition and/or correction can be complicated or prevented. For example, in the absence of a record of the error, the bot cannot be trained to avoid that error. Further, without a record of the error, the identification of the cause of the error and/or the inputs leading to that error cannot be identified. In addition, preventing sensitive data from being used to train bots also prevents the identification of the patterns associated with the successful completion of input processing and task performance. Therefore, a massive amount of real-world data that can reveal strengths and weaknesses of models used by the bots is excluded from being used to train and improve those models.

Presently, with this information void, there is a lack of awareness of the impact associated with errors being experienced while the bot is performing tasks on behalf of a user. The lack of awareness is made worse by the fact that presently not only might the input that caused the error be excluded from being used for training or error identification, but information that provides a context of the criticality, a contextualizing frequency (e.g., among a product family, among a geography, among a customer segment, etc.), common input patterns, common resolutions, common originating user attributes, etc. surrounding the error is excluded from consideration among support teams trying to identify and/or resolve the error. That is, not only are support teams largely unaware of errors, but even when they are aware they have no knowledge of the valuable context for truly understanding those errors.

Presently this contextual data is not collected, generated, and/or provided to the support teams. The result is that many errors and their criticality and/or connectedness are ignored by support teams that are merely looking at the frequency of errors overall. For example, say that only 0.5% of overall "case status" requests to a bot are failing. This would likely not raise any concerns among support teams and would likely be largely ignored. However, the 0.5% of failures overall may actually represent 100% of the "case status" request failures for a particular product family or for requests originating for a particular geographic region. This error, while unappreciated as such, is therefore critical for that product family or geography. However, without additional context the support team will remain unaware of critical error relationships. As a result, support teams may assume that errors having an actual business impact are just one-off issues with an underlying API call or have some other insignificant or inconsequential cause.

Further, without observability of the input and/or context of the error, support teams are left with a lack of observability data to compare and contrast working or non-working scenarios in bot operations. For example, the system may be able to recognize only 80% of a first user's speech from a particular geographic region. In contrast, the same system may be able to recognize 98% of a second user's speech from the same geographic region. Without an awareness of this relationship, a support team may be missing out on an opportunity to compare the successful/unsuccessful instances to identify precise causes of errors and/or ways to improve models that are leading to the errors.

In general, error identification and/or resolution in bots is limited by a lack of awareness of the substance of inputs causing errors and/or the context surrounding those errors. As a result, present methods of error identification and/or resolution in bots regularly cause support teams to ignore critical errors and lead to an ignorance of the cause of errors that may delay or prevent their resolution.

——Error Context for Bot Optimization——

The techniques herein introduce mechanisms to notify and/or inform operational support teams about high-impact bot issues that may have easily gone unnoticed in the absence of these techniques. The techniques include providing contextual data including business and environmental data such as support case, product, product family, geographic location of the user (e.g., city, country, regions, etc.) to support teams as part of observability telemetry. This data may then be analyzed and aggregated to provide meaningful insights within error notifications. Further, the techniques may include client application functionality that can dynamically determine when to acquire specific audio samples for improving the accuracy of, for example, speech recognition by a bot. Furthermore, the client application functionality may request a user's consent to share their data, such as their audio samples, with the bot provider.

Illustratively, the techniques described herein may be performed by hardware, software, and/or firmware, such as in accordance with error contextualizing process 248, which may include computer executable instructions executed by the processor 220 (or independent processor of interfaces 210) to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the error contextualizing process 248.

Operationally and according to various embodiments, the techniques herein provide error indications with aggregated contextual information to empower support teams and/or support systems with the tools to rapidly identify and/or act on the source of bot errors. The techniques herein also provide accelerated error resolution and model improvements in addition to adding a consent component to user input sharing for training purposes and the ability to compare and contrast user attributes among successful and/or unsuccessful outcomes at the bot.

Figure 4:
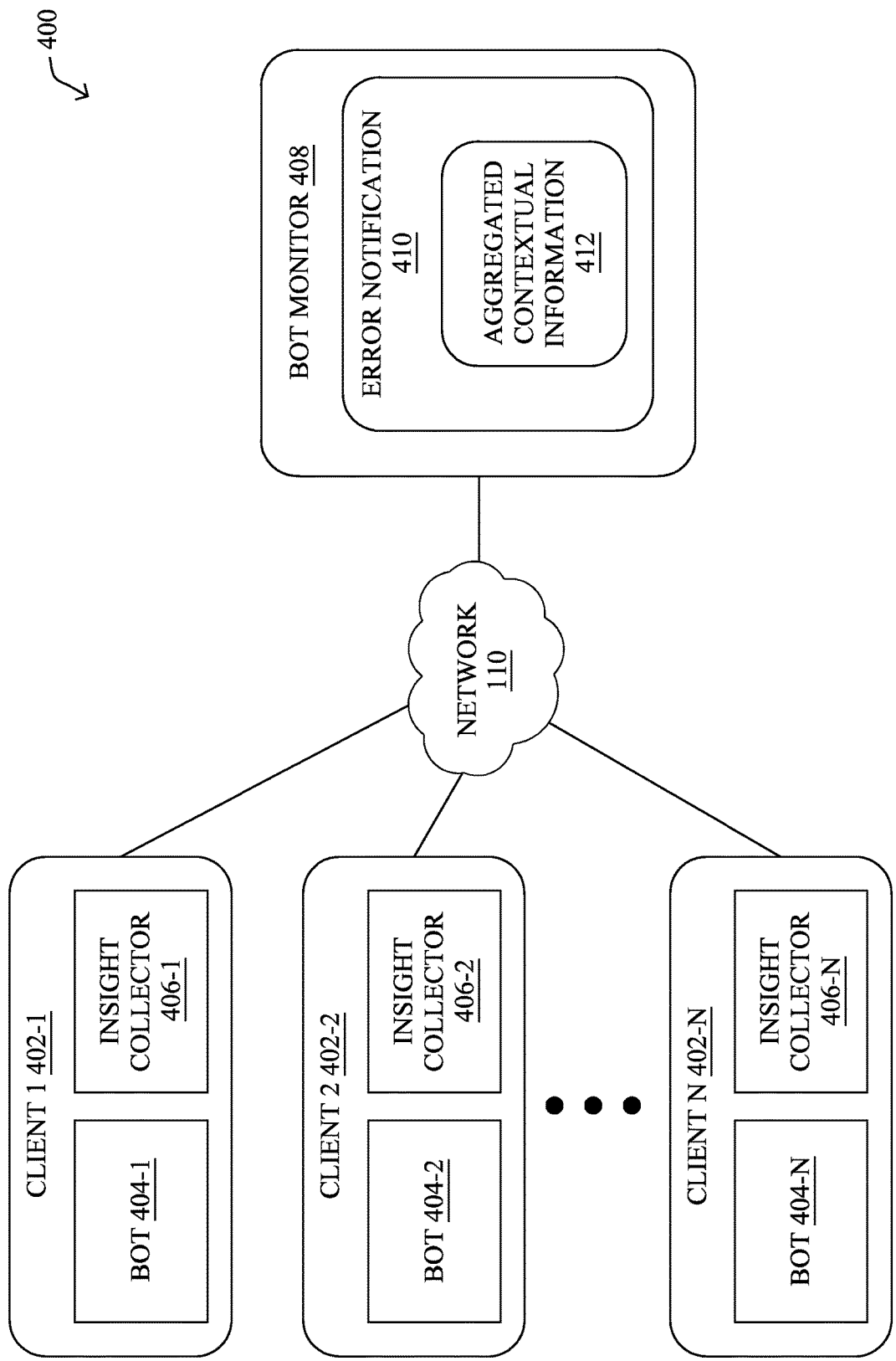
FIG. 4 illustrates an example of an architecture utilized to provide error context for bot optimization.

Specifically, as shown in FIG. 4, in one embodiment, example architecture 400 may be utilized to provide error context for bot optimization. Architecture 400 may include clients 402. Clients 402 may include users of bot 404. Clients 402 can include distinct computing devices. Each client may be a computing device that is owned, operated, controlled etc. by a user who is separate from providers of bot 404. Clients 402 may be computing devices that are not owned, operated, and/or fully controlled by the providers of bot 404. For example, clients 402 may include a computing device of a user running an instance of a bot 404 on their device. That is, bot 404 may be part of a bot system or application that uses some centralized resources or framework to run individual instances of a bot across individual clients (e.g., a first bot 404-1 operating on a first client 402-1, a second bot 404-2 operating on a second client 402-2, an Nth bot 404-N operating on an Nth client 402-N, etc.) while having some centralized control of, processing for, updating of all the instances of the bot 404. In other examples, bot 404 may not execute on a client device, but rather client 402 may be client sessions accessing bot functionality over a server or collection of servers configured to provide the interface.

Each bot 404 may be an instance of a virtual assistant running on a client. Bot 404 may obtain user inputs (e.g., spoken, typed, gestured, selected, etc.) at the client. For example, bot 404 may obtain user inputs from a user interface such as a microphone, a camera, a keyboard, a touchscreen, etc.

Bot 404 may process the inputs to determine an intent of a user request. Bot 404 may process the inputs entirely on the client device, partially on the client device and partially on one or more other devices (e.g., servers of the bot provider, cloud-based computational assets of the bot provider, etc.), and/or entirely on the one or more other devices. For example, a portion of the input may be processed using models and/or computational resources connected to the client device via a network 110. Regardless of where the inputs are processed, the goal of the processing may be to identify the intent of a request in the input and execute that request on behalf of the client.

In some instances, the process of identifying the intent and performing a requested task may be successful. In other instances, the process may be unsuccessful. For example, bot 404 may experience an error that prevents it from being able to recognize and/or complete a request. As previously described, both the successful and the unsuccessful processes performed by bot 404 may be useful in improving the operations and/or underlying models of bot 404. As such, insight collectors 406 may be deployed along with each bot 404 at clients 402. An insight collector may include a set of instructions that may be part of or separate from the set of instructions making up bot 404. The set of instructions making up the insight collector may be stored and/or executed at each client. That is, insight collectors 406 may be local to a user's device or associated with a client session with bot 404. In some examples, bot 404 and/or insight collectors 406 may be components of a virtual conferencing application, a cloud-based team collaboration application, a helpdesk application, etc. executing at a user's device and/or being accessed by a client session.

An insight collector may be executable to monitor the operations of its corresponding bot. For example, a first insight collector 406-1 may monitor the operations of a first bot 404-1 executing at a first client 402-1, a second insight collector 406-2 may monitor the operations of a second bot 404-2 executing at a second client 402b-2; a Nth insight collector 406-N may monitor the operations of an Nth bot 404-N executing at an Nth client 402-N, etc. An insight collector may be executable to collect insights to the operations of their respective bot 404 and/or to communicate these insights to a bot monitor 408.

Bot monitor 408 may be stored and/or executed on a different device than clients 402. For example, bot monitor 408 may be stored and/or executed on a computing device, a server, a cloud location, etc. that is owned, operated, controlled by the bot provider or one of their agents. As such, the insights collected by insight collectors 406 may be collected by bot monitor 408 over network 110. Bot monitor 408 may collect the insights provided by insight collectors 406 and may report them to support teams or monitoring services for use in identifying errors, correcting errors, improving bot performance, etc. For example, bot monitor 408 may be an analytics engine and/or proactive error monitoring system that provides granular performance insights to support teams to take swift remediation actions.

As outlined above, presently interactions with bot 404 are excluded from some uses. For instance, potentially sensitive data is excluded from use in training data sets for improving bot 404. For example, audio recording samples of user inputs are not included in data sets made available for improving bot 404. This exclusion may be in place to avoid customer concerns over sharing of their potentially sensitive data and/or to avoid violating rules, laws, regulations, policies, etc. regarding data handling.

However, insight collectors 406 may operate to identify which user inputs (regardless of its sensitive nature) would be particularly useful in a training set. Insight collectors 406 may, as described in greater detail below, honor customer concerns over sharing their data while making this data available for use in training data sets. Insight collectors 406 may accomplish this by identifying useful contextual information and samples associated with an error, storing that data local to the client, and informing a user and/or obtaining their consent prior to sending those locally stored insights and samples to a bot monitor 408.

For example, each insight collector may monitor its corresponding bot and track when its corresponding bot is unable to recognize an intent of a request expressed in a user input. For instance, a user may convey a request to a bot by speaking to it. An audio recording sample of a user input to a bot may be collected and processed to determine an intent of the user input. The audio recording sample may by stored when an insight collector determines that its corresponding bot was unable to successfully determine the intent of the spoken request. The insight collector may cause the sample of the user input to be stored local to the client where it was collected (e.g., at a data storage location associated with the user who originated the input). For example, the insight collector may cause the sample of the user input to be stored on the user's device. In some examples, the insight collector may cause the user input to be securely stored in association with a client session on a device. Therefore, the sample may not be automatically sent to, used by, or stored at a bot providers device, a bot providers cloud storage, a bot provider's servers, a bot provider's monitoring service, etc., but may initially remain stored at a location controlled by the user and/or dedicated to a client session.

In various embodiments, the insight collector may also monitor the number of times that its corresponding bot experiences an error. Insight collector may increment an error counter each time it detects an error is experienced by its corresponding bot. For example, each time an error of a specific type (e.g., bot not being able to recognize an intent of a user input correctly at the client) occurs at a bot, the corresponding insight collector may cause the sample of that input to be saved local to the client and increment a recognition error counter for that sample.

As a user continues to interact with bot 404 and provide additional inputs, same and/or similar user inputs to previous inputs that were failed to be recognized by bot 404 may also fail to be recognized by bot 404. For example, additional instances of the bot not being able to infer the intent of a user input may be detected by the insight collector. The insight collector may continue to save samples of these additional inputs local to the client and continue to increment the recognition counter with each additional error.

The error counter associated with an error type may eventually reach or exceed a threshold amount of errors (e.g., a certain amount of errors, a certain amount of errors over a quantity of time, etc.). When the counter meets or exceeds the error count threshold, the insight collector may dynamically inform a user about the errors and/or may request consent from the user to send the corresponding sample inputs to the bot provider for training purposes. In some examples, the user may be provided with an opportunity to review the sample inputs (e.g., listen to the recorded audio sample) when asked for consent.

In instances where consent to use the samples is provided, those samples may be communicated to bot monitor 408. The samples may be used at bot monitor 408 to identify the underlying cause of a particular error, identify a solution to the error, identify and/or instate an improvement to the operations of bot 404 (e.g., further train a model) to avoid further instances of the error. In instances where consent to use only some of the samples collected and/or saved local to the client is provided, only those samples may be communicated to bot monitor 408. In instances where consent to use the samples is denied, those samples may not be communicated to bot monitor 408 and may be erased at the client.

Additionally, as outlined above, contextual information surrounding the errors experienced by bot 404 can be just as valuable in identifying an error, identifying a source of an error, identifying a criticality of an error, and identifying a resolution for an error as is a sample of the user input that caused the error. The insight collector may capture this important contextual data when bot 404 experiences an error at a client. For example, the insight collector may capture contextual business and environment related data for each error that it detects at the bot that it is monitoring.

For instance, insight collector may capture contextual information such as a product family associated with the error (e.g., the family of the product through which the input was received, the product referenced in the request, etc.). In various embodiments, insight collector may capture contextual information such as a geographic region associated with the error (e.g., a country, state, province, city, region, etc. of a user, a user device where the input was received, a user device where bot 404 is executing, etc.). Insight collector may also capture contextual information such as a customer segment associated with the error (e.g., a classification of a customer group to which the user belongs, etc.). Additionally, insight collector may capture contextual information such as a support team associated with the error. A support team may include a team that handles a business object for which the user is submitting a request and/or attempting to perform tasks. For example, a support team may be a team handling a routing product, a collaboration product, a licensing product. As such, a support team may include a routing technical support team, collaboration technical support team, licensing technical support team, etc.

Upon collecting this contextual information for an error, an insight collector may send it to bot monitor 408. The contextual information may be sent as metadata as part of observability telemetry data (e.g., details of when the error was observed, details of who observed or reported the error, a sample of an input associated with an error, a response given by the bot when the error was experienced, etc.) notifying bot monitor 408 of the error. The contextual information may be sent to bot monitor 408 over network 110.

Since each of the insight collectors 406 of clients 402 are sending this information for errors encountered by their respective bot, bot monitor 408 can build a holistic and/or system-wide catalog of the errors being encountered by one or more bot instances across one or more clients and/or error trends across time. Given its ability to monitor multiple bot operations across multiple clients and/or multiple bot instances, bot monitor 408 is uniquely situated to aggregate its overview perspective to provide aggregated contextual information 412.

Bot monitor 408 may generate aggregated contextual information 412 by first identifying historical errors that are correlated to an error being processed (e.g., an error for which error notification 410 is being generated). The correlated errors may be from a same client, same user, same bot instance, etc. as the error being processed or they may be from different clients, different users, different bot instances, etc. Correlated errors may include errors that have a relationship to the error being processed. For example, correlated errors may be historical errors of the same type and/or with contextual information correlated to the error being processed.

For instance, a correlated error may be a historical error associated with the same product family (e.g., as determined by the product family identified in the contextual information received by bot monitor 408 in relation to the historical error) as the error being processed. In an example, correlated error may be a historical error associated with the same geographic region (e.g., as determined by the geographic region identified in the contextual information received by bot monitor 408 in relation to the historical error) as the error being processed. In further examples, the correlated error may be a historical error associated with the same customer segment (e.g., as determined by the customer segment identified in the contextual information received by bot monitor 408 in relation to the historical error) as the error being processed. The correlated error may also be a historical error associated with the same support team (e.g., as determined by the support team identified in the contextual information received by bot monitor 408 in relation to the historical error) as the error being processed. In addition, the correlated error may also be a historical error related to a same task (e.g., providing a status update for a case).

Bot monitor 408 may generate aggregated contextual information 412 from the combination of contextual information of the error being processed and the related contextual information among its correlated errors. Aggregated contextual information 412 may include contextual insights that place the contextual data of the error being processed in a broader context of the contextual insights collected across a plurality of correlated errors from the same client and/or from across different clients.

For example, aggregated contextual information 412 may include contextual insights that place the contextual information of the product family associated with the error being processed in the broader context of the historical errors associated with the same product. For example, bot monitor 408 may calculate, based on the contextual information of the error being processed and/or the contextual information of correlated errors, a percentage of errors related to a particular product that are of the same type as the error being processed over a particular period of time. This information may then be added as aggregated contextual information 412 to error notification 410 for the error being processed.

In another example, aggregated contextual information 412 may include contextual insights that place the contextual information indicating the geographic region associated with the error being processed in the broader context of the historical errors associated with the same geographic region. For example, bot monitor 408 may calculate, based on the contextual information of the error being processed and/or the contextual information of correlated errors, a percentage of the errors for users in a particular geographic region that are of the same type as the error being processed over a particular period of time. This information may then be added as aggregated contextual information 412 to error notification 410 for the error being processed.

In additional examples, aggregated contextual information 412 may include contextual insights that place the contextual information indicating the customer segment associated with the error being processed in the broader context of the historical errors associated with the same customer segment. For example, bot monitor 408 may calculate, based on the contextual information of the error being processed and/or the contextual information of correlated errors, a percentage of the errors for users in a particular customer segment that are of the same type as the customer segment associated with the error being processed over a particular period of time. This information may then be added as aggregated contextual information 412 to error notification 410 for the error being processed.

In some cases, aggregated contextual information 412 may include contextual insights that place the contextual information indicating the support team that handles the business object associated with the error being processed in the broader context of the historical errors associated with the same support team. For example, bot monitor 408 may calculate, based on the contextual information of the error being processed and/or the contextual information of correlated errors, a percentage of the errors associated with a particular support team that are of the same type as the error being processed over a particular period of time. This information may then be added as aggregated contextual information 412 to error notification 410 for the error being processed. For example, the aggregated contextual information 412 may provide contexts such as "status request of all cases handled by the Routing technical support team are experiencing error," "status request of all cases handled by Collaboration technical support team are experiencing errors," "status request of all cases handled by Licensing technical support team are experiencing errors," etc.

Bot monitor 408 may generate an error notification 410 including aggregated contextual information 412. Aggregated contextual information 412 may provide an aggregated context to an error notification 410. Error notification 410, including aggregated contextual information 412, may be provided by bot monitor 408 to bot support teams to identify and/or execute remedial actions to resolve and/or prevent future instances of the error. Error notification 410 may include details of when the error was observed, details of who observed or reported the error, a sample of an input associated with an error, a response given by the bot when the error was experienced, contextual information of the error, and/or aggregated contextual information 412. Error notification 410 may be sent to and/or retrieved by support teams and/or an error monitoring service to address the error. The support teams may utilize the aggregated contextual information 412 to better identify the source of the error, to understand its criticality, and to identify appropriate remedial action.

Further, observability data (e.g., metrics, events, logs, telemetry, etc.), input samples, contextual information, etc. collected across multiple operations, multiple user session, multiple clients, etc. may be utilized to compare and contrast working and non-working scenarios. In this manner, patterns leading to the successful performance of a task by bot 404 or the unsuccessful performance of the task by bot 404 may be identified. For example, when bot 404 is experiencing failures in performing a task (e.g., interpreting the voice/speech of an input and converting it to text, etc.) the multiple user-specific attributes may be used to identify one or more users with overlapping or similar attributes.

For example, bot monitor 408 may perform similarity scoring of users providing the inputs associated with bot operations. The scoring may be based on indications of user attributes collected from insight collectors 406. The similarity scoring may range from identifying a match of a single attribute (e.g., a geographic location match) among users to a very granular scoring system based on multiple attributes such geographic location, native-language, slang used, age of user, etc. One or more users may be identified where the outcome of the specific task is success for some and failure for others. Similarity scoring among those users may be utilized to identify deficiencies in a model used by the bot to perform the specific task with respect to processing an input from a user with particular attributes. The identified deficiencies may be used to refine models that allow bot 404 to better perform tasks for a broader range of users with varied attributes.

Figure 5:
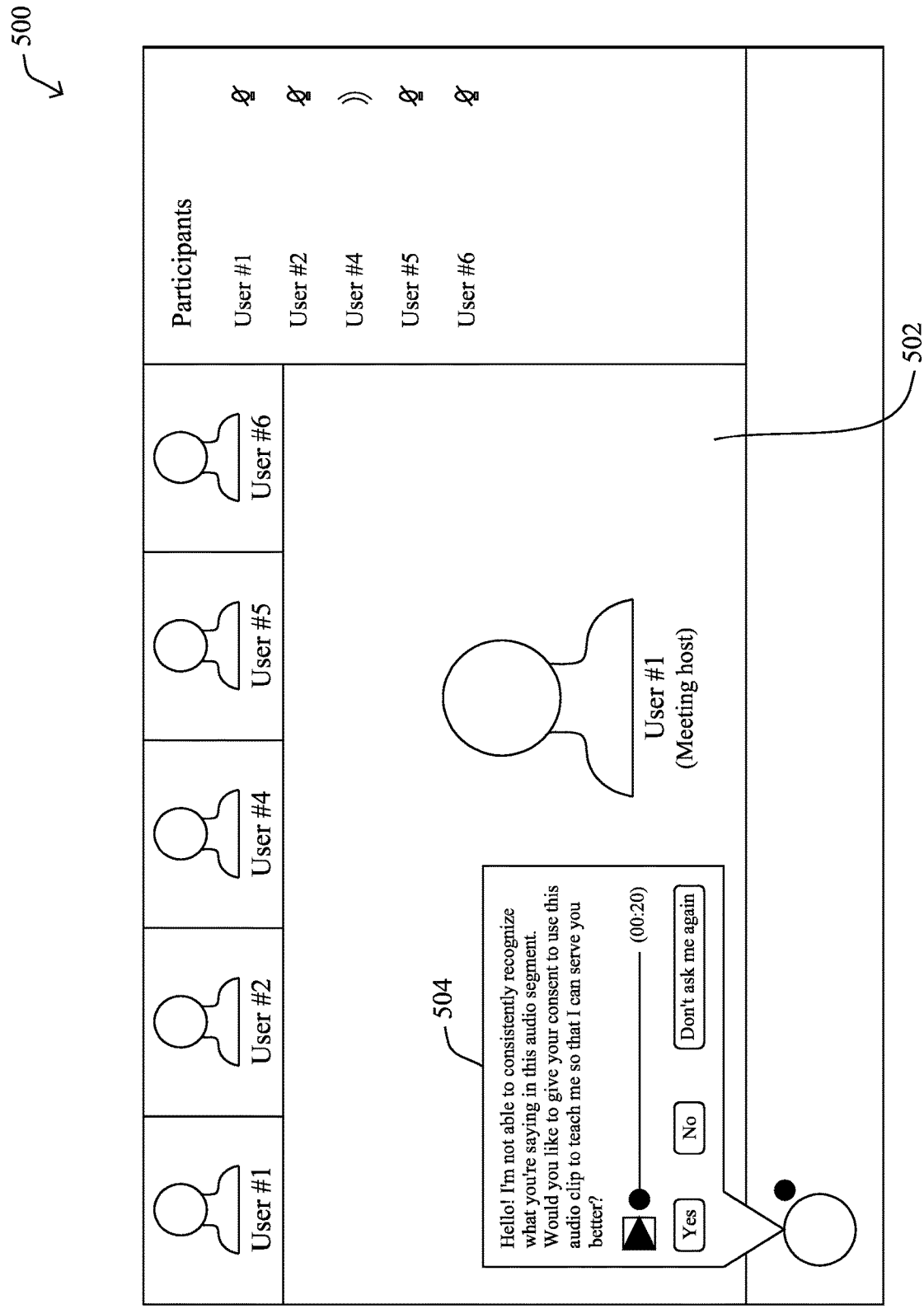
FIG. 5 illustrates an example of a user interface for obtaining user consent to share user input samples.

FIG. 5 illustrates an example of a user interface 500 for obtaining user consent to share user input samples to improve bot functionality, according to various embodiments. User interface 500 is illustrated as an interface of a virtual conferencing application, but consent can be garnered via any user interface.

User interface 500 may, in some examples, be the user interface through which a bot is accessed and/or user requests to the bot are communicated. For example, a user 502 may issue a voice command input to a bot functionality of the virtual conferencing application.

As previously described, the bot may encounter an error and/or fail to perform a task being requested by the user in the voice command. This may occur multiple times, with each instance leading to a sample of the voice command being saved local to the user's device and an error counter being incremented to account for the additional instance of the error. When an error counter meets or exceeds a threshold amount of errors, an attempt to obtain consent to send the saved input samples to a bot monitor for training may be triggered.

A consent request 504 may be presented via user interface 500 to a user 502. The user 502 may be the user who controls the device where the sample was collected and/or the same user who issued the input samples. Consent request 504 may inform user 502 that the bot encountered an error or was otherwise unable to perform a requested task. Consent request 504 may ask user 502 for permission to send a sample of the input for bot training purposes. In addition, consent request 504 may provide user 502 with a preview of the input sample(s) that it is requesting to send. Consent request 504 may provide user 502 with selectable options to provide consent, deny consent, and/or to prevent future consent requests.

Figure 6:
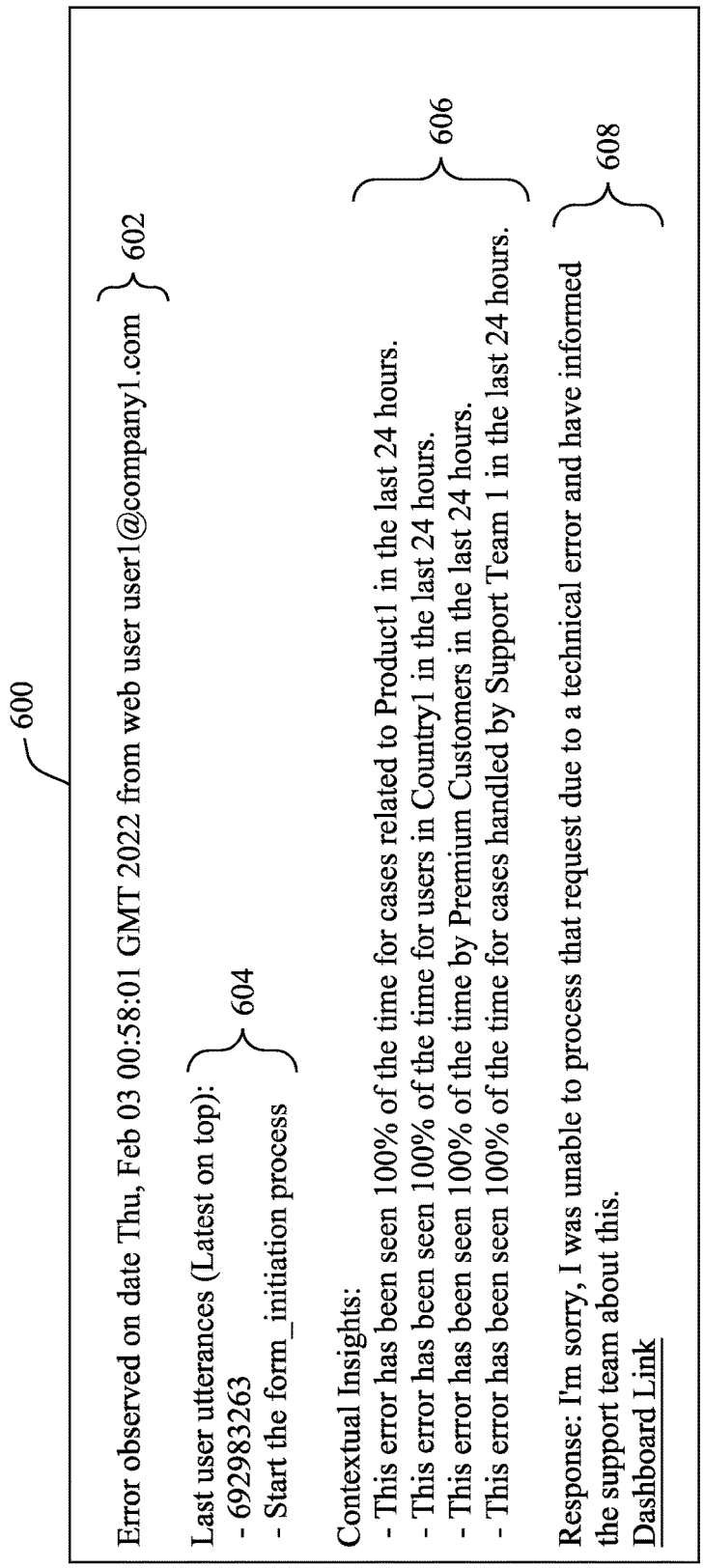
FIG. 6 illustrates an example of an error notification including aggregated contextual information.

FIG. 6 illustrates an example of an error notification 600 (e.g., an implementation of notification 410 above) including aggregated contextual information 606 (e.g., information 412 above), according to various embodiments. Error notification 600 may be a report generated by a centralized monitoring service (e.g., bot monitor 408) that obtains observability data (e.g., metrics, events, logs, telemetry, etc.), input samples, contextual information, etc. collected across multiple operations, multiple user session, multiple clients, etc. The centralized monitoring service may generate an error notification 600 for a particular error or set of errors experienced by one or more clients interacting with a bot.

Error notification 600 may specify error observation metrics 602. Error observation metrics 602 may include information characterizing the circumstances of the error's observation. For example, error observation metrics 602 may specify when the error was observed, a platform it was observed on, a user associated with the observations, etc. These error observation metrics 602 may be included in an error indication sent from the client, where the error occurred, to the centralized monitoring service.

Additionally, error notification 600 may include user input data 604. User input data 604 may include information about the user input associated with the error. For example, user input data 604 may specify the content of the user input that led to the error. In some examples, the user input data 604 may include a transcript or a sample of a portion of the user interface (e.g., last utterances). User input data 604 may also be included in an error indication sent from the client, where the error occurred, to the centralized monitoring service.

Error notification 600 may also include a response 608. Response 608 may be the communication by the bot to the user reporting the error and/or a failure to complete the task being requested in the input. Response 608 may be included in an error indication sent from the client, where the error occurred, to the centralized monitoring service. An example response may also include various links for the user to access a dashboard for further information on the error, and so on.

In addition, error notification 600 may include aggregated contextual information 606 (e.g., aggregated contextual information 412 above). Aggregated contextual information 606 may be computed by the centralized monitoring service. The aggregated contextual information 606 may be computed from a collection of contextual data obtained from a plurality in error indications sent from the clients, where the errors occurred, to the centralized monitoring service. As such, aggregated contextual information 606 may be computed from data obtained in association with multiple errors (e.g., from the same user, from other users, etc.).

Aggregated contextual information 606 may include contextual insights to the error. The contextual insights may be in reference to the other multiple historical errors obtained by the centralized monitoring service. For example, the contextual insight may be a statistic computed by aggregating contextual information obtained for the particular error being reported with contextual information from multiple historical errors to provide insight into the criticality, frequency, likely cause, etc. of the particular error being reported.

For example, error notifications 600 may be a notification of an error resulting from a "case status" request to a bot. The contextual information obtained for this error may identify the error as being observed in all business objects (e.g., support tickets, cases, etc.) that are related to a specific product (e.g., "Product1"), being initiated by a user in "Country1," being handled in "Country1," being initiated by a "Premium Customer," and/or that the error is observed in all business objects (e.g., support tickets, cases, etc.) being handled by a specific support team (e.g., "SupportTeam1" which may include a routing technical support team, a collaboration technical support team, licensing technical support team, etc.) Correlated errors, such as those errors of the same type (e.g., associated with a "status request"), resulting from the same input, related to the same product, referencing the same resource within "Product1," originating in a same geographic location, being handled in a same geographic location, originating within a same customer segment, handled by a same support team, originating from a user having similar attributes, etc., may be identified as candidates to have their contextual information aggregated with the contextual information for the error being reported in order to generate aggregated contextual information 606.

Aggregated contextual information herein may be calculated using the contextual information for the error being reported and the contextual information obtained in connection with the identified correlated errors. As such, aggregated contextual information may report the error in the context of the correlated errors. For example, aggregated contextual information may specify that the error being reported makes up X % of the errors related to the cases (e.g., tickets, etc.) that are associated with "Product1" aggregated in the last X hours. In some examples, aggregated contextual information may specify that the error being reported makes up X % of the errors originated by users in "Country1" aggregated in the last X hours. Aggregated contextual information may, in some instances, specify that the error being reported makes up X % of the errors from "Premium Customers" aggregated in the last X hours. In some examples, aggregated contextual information may specify that the error being reported makes up X % of the errors related to the cases (e.g., tickets, etc.) that are handled by "SupportTeam1" aggregated in the last X hours. Of course, different combinations of various types of aggregated contextual information and single types of aggregated contextual information may be used in error notifications, accordingly.

The centralized monitoring service may provide error notification 600 to a support team or monitoring service. Error notifications may be used by the support team to address the error. The contextual insights of aggregated contextual information 606 may provide the additional context to the support team to identify the criticality, frequency, likely cause, etc. of an error.

Figure 7:
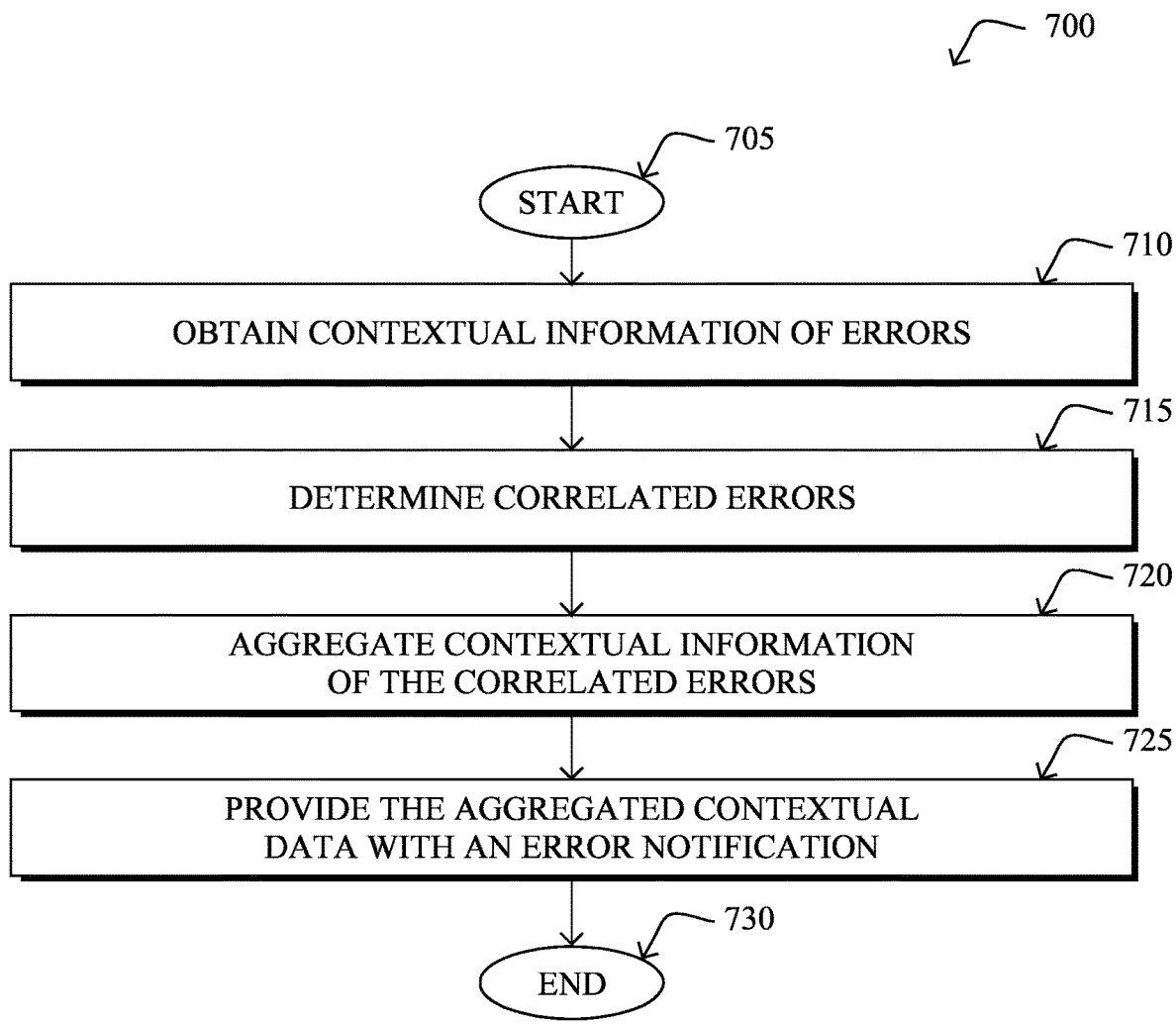
FIG. 7 illustrates an example simplified procedure for providing error context for bot optimization in accordance with one or more embodiments described herein.

In closing, FIG. 7 illustrates an example simplified procedure for providing error context for bot optimization in accordance with one or more embodiments described herein, particularly from the perspective of a bot monitoring engine. For example, a non-generic, specifically configured device (e.g., device 200, particularly a bot monitoring device) may perform procedure 700 by executing stored instructions (e.g., process 248, such as an error contextualizing process). The procedure 700 may start at step 705, and continues to step 710, where, as described in greater detail above, a device may obtain a plurality of indications of errors experience by a bot performing tasks. Each of the plurality of indications may include contextual information of its corresponding error. The contextual information of the corresponding error may include an indication of a product family associated with the corresponding error. In various embodiments, the contextual information of the corresponding error may include the business object associated with an error. For example, the business object may include the ticket, bug, and/or return merchandise authorization (RMA) when a user asks a question about a status of the ticket, bug, RMA, respectively. Further, the contextual information of the corresponding error may include an indication of a geographical location associated with the corresponding error. Furthermore, the contextual information of the corresponding error may include an indication of a team that handles the business object (e.g., case, ticket, bug, RMA) associated with the corresponding error. The team may include any type of team that handles queries, requests, etc. with respect to the business object. In some examples, this may include a technical support team. In some examples, this may include other types of teams such as a financial investor team than handles bond related queries verses stock related queries in the context of a financial bot related workflows, etc.

In various embodiments, each of the plurality of indications of the errors may include an audio sample of a user request that the bot failed to recognize. In some examples, these audio samples may include sensitive user data (e.g., personally identifiable information (PII), private data, highly confidential data, financial data, healthcare data, purchase history, etc.). As such, these samples may be stored local to a user's device. The audio samples may be obtained from the storage location local to the user's device in response to an indication of consent from the user to share the samples. The device may cause a model used by the bot to recognize user intent to be trained using the audio sample. For example, the model may be refined through training to better understand the audio sample and its intent in order to avoid encountering the same error in the future.

At step, 715, as detailed above, the device may determine correlated errors among the errors experienced by the bot. The correlated errors may be errors of the same type and/or that share one or more attributes in common.

At step, 720, as detailed above, the device may aggregate contextual information of each of the correlated errors into aggregated contextual data. Aggregating the contextual information may include calculating a contextual insight for a particular correlated error that places it in the context of a plurality of correlated errors.

At step, 725, as detailed above, the device may provide the aggregated contextual data with an error notification for a particular correlated error. The aggregated contextual data for the particular correlated error may include an indication of a portion of a total amount of errors related to a particular product family that are of a same type as the particular correlated error. Further, the aggregated contextual data for the particular correlated error may include an indication of a portion of a total amount of errors originating in a particular geographic location that are of a same type as the particular correlated error.

Furthermore, aggregated contextual data for the particular correlated error may include an indication of a portion of a total amount of errors related to a particular customer segment that are of a same type as the particular correlated error. Additionally, the aggregated contextual data for the particular correlated error may include an indication of a portion of a total amount of errors related to the business object (e.g., case, ticket, bug, RMA, etc.) that is handled by a particular support team that are of a same type as the particular correlated error.

In various embodiments, the device may obtain a set of audio samples collected from different users requesting the bot to perform a task. Each audio sample of the set of audio samples may include an indication of a user attribute of a user who that audio sample is recorded from. The device may identify, based on correlations between user attributes of a portion of the different users whose request achieved a particular outcome, a user attribute associated with the particular outcome. The indication of the user attribute may be an indication of a geographic location of the user, an indication of a native language of the user, an indication of a type of slang used by the user, an indication of an age (e.g., date of birth, year of birth, numerical age, age range, etc.) of the user. These user attributes may be obtained from a user profile, from observation of the user's interactions with the bot or another application, from a user selection, etc. In various embodiments, these user attributes may not include and/or be associated with an indication of the actual identity of the user in order to reduce exposure to privacy concerns. As such, only the metadata-like user attributes may be used for model training purposes.

The device may identify, based on the aggregated contextual data for the particular correlated error, a criticality of the particular correlated error. Additionally, the device may identify, based on the aggregated contextual data for the particular correlated error, a remediation technique to prevent future instances of errors of a same type as the particular correlated error.

The simplified procedure 700 may then end in step 730, notably with the ability to continue providing error notifications with aggregated contextual data for subsequent errors using the same general procedure. In fact, the particular correlated error for which the aggregated contextual data was provided with the error notification may be used as part of the data set used for aggregated contextual data calculations in subsequent correlated errors. Other steps may also be included generally within procedure 700.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide error context for bot optimization. In particular, the techniques herein include a method to notify and inform operational support teams about high impact bot issues that might have easily gone unnoticed. The contextual business and environmental data such as support case, product, product family, geographic location of the user (city, country, regions, etc.), team handling the case, etc. may be sent as part of observability telemetry and then analyzed to provide meaningful insights within error notifications. This concept is applicable to any business object related data and can be used in financial, hospitality and several industries. The techniques also introduce an insight collector in a client application that dynamically determines the need to get specific audio samples for improving the accuracy of speech recognition. The collector can therefore intelligently request user's consent to share the audio samples with a bot provider. Moreover, the techniques provide a mechanism to compare and contrast situational and/or user attributes in successful bot operations and unsuccessful bot operations to better identify root causes of bot successes and/or bot failures. As such, the techniques described herein introduce new mechanisms to collect, combine, and analyze data collected from monitoring bot operations in a way that unlocks previously hidden away insights to streamline and boost bot improvement and error resolution.

According to the embodiments herein, an illustrative method herein may comprise: obtaining, by a device, a plurality of indications of errors experienced by a bot performing tasks, wherein each of the plurality of indications includes contextual information of a corresponding error; determining, by the device, correlated errors among the errors experienced by the bot; aggregating, by the device, contextual information of each of the correlated errors into aggregated contextual data; and providing, by the device, the aggregated contextual data with an error notification for a particular correlated error.

In one embodiment, the contextual information of the corresponding error includes an indication of a product family associated with the corresponding error. In one embodiment, the contextual information of the corresponding error includes an indication of a geographical location associated with the corresponding error. In one embodiment, the contextual information of the corresponding error includes an indication of a team associated with the corresponding error In one embodiment, each of the plurality of indications of the errors includes an audio sample of a user request that the bot failed to recognize, wherein the audio sample includes sensitive user data. In one embodiment, wherein the audio sample is obtained from a storage location local to a user's device in response to an indication of a consent to share from the user. In one embodiment, the device may cause a model used by the bot to recognize user intent to be trained using the audio sample. In one embodiment, the aggregated contextual data for the particular correlated error includes an indication of a portion of a total amount of errors related to a particular product family that are of a same type as the particular correlated error.

In one embodiment, the aggregated contextual data for the particular correlated error includes an indication of a portion of a total amount of errors originating in a particular geographic location that are of a same type as the particular correlated error. In one embodiment, the aggregated contextual data for the particular correlated error includes an indication of a portion of a total amount of errors related to a particular customer segment that are of a same type as the particular correlated error In one embodiment, the aggregated contextual data for the particular correlated error includes an indication of a portion of a total amount of errors handled by a particular team that are of a same type as the particular correlated error.

In one embodiment, the device obtains a set of audio samples collected from different users requesting the bot to perform a task, wherein each audio sample of the set of audio samples includes an indication of a user attribute of a user who that audio sample is from; and identifies, based on correlations between user attributes of a portion of the different users whose request achieved a particular outcome, a user attribute associated with the particular outcome. In one embodiment, the indication of the user attribute is an indication of a geographic location of the user. In one embodiment, the indication of the user attribute is an indication of a native language of the user. In one embodiment, the indication of the user attribute is an indication of a type of slang language used by the user. In one embodiment, the indication of the user attribute is an indication of an age of the user.

According to the embodiments herein, an illustrative tangible, non-transitory, computer-readable medium herein may have computer-executable instructions stored thereon that, when executed by a processor on a computer, may cause the computer to perform a method comprising: obtaining a plurality of indications of errors experienced by a bot performing tasks, wherein each of the plurality of indications includes contextual information of a corresponding error; determining correlated errors among the errors experienced by the bot; aggregating contextual information of each of the correlated errors into aggregated contextual data; and providing the aggregated contextual data with an error notification for a particular correlated error.

In one embodiment, the method may include identifying, based on the aggregated contextual data for the particular correlated error, a criticality of the particular correlated error. In one embodiment, the method may include identifying, based on the aggregated contextual data for the particular correlated error, a remediation technique to prevent future instances of errors of a same type as the particular correlated error.

Further, according to the embodiments herein an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: obtain a plurality of indications of errors experienced by a bot performing tasks, wherein each of the plurality of indications includes contextual information of a corresponding error; determine correlated errors among the errors experienced by the bot; aggregate contextual information of each of the correlated errors into aggregated contextual data; and provide the aggregated contextual data with an error notification for a particular correlated error.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, by a device, a plurality of indications of errors experienced by a bot performing tasks, wherein each of the plurality of indications includes contextual information and an audio sample of a user request that the bot failed to recognize of a corresponding error;
   determining, by the device, correlated errors among the errors experienced by the bot;
   aggregating, by the device, contextual information of each of the correlated errors into aggregated contextual data; and
   providing, by the device, the aggregated contextual data with an error notification for a particular correlated error.

2. The method as in claim 1, wherein the contextual information of the corresponding error includes an indication of a product family associated with the corresponding error.

3. The method as in claim 1, wherein the contextual information of the corresponding error includes an indication of a geographical location associated with the corresponding error.

4. The method as in claim 1, wherein the contextual information of the corresponding error includes an indication of a team associated with the corresponding error.

5. The method as in claim 1, wherein the audio sample includes sensitive user data.

6. The method as in claim 5, wherein the audio sample is obtained from a storage location local to a device of a user in response to an indication of a consent to share from the user.

7. The method as in claim 5, further comprising:
   causing, by the device, a model used by the bot to recognize user intent to be trained using the audio sample.

8. The method as in claim 1, wherein the aggregated contextual data for the particular correlated error includes an indication of a portion of a total amount of errors related to a particular product family that are of a same type as the particular correlated error.

9. The method as in claim 1, wherein the aggregated contextual data for the particular correlated error includes an indication of a portion of a total amount of errors originating in a particular geographic location that are of a same type as the particular correlated error.

10. The method as in claim 1, wherein the aggregated contextual data for the particular correlated error includes an indication of a portion of a total amount of errors related to a particular customer segment that are of a same type as the particular correlated error.

11. The method as in claim 1, wherein the aggregated contextual data for the particular correlated error includes an indication of a portion of a total amount of errors handled by a particular team that are of a same type as the particular correlated error.

12. The method as in claim 1, further comprising:
   obtaining, by the device, a set of audio samples collected from different users requesting the bot to perform a task, wherein each audio sample of the set of audio samples includes an indication of a user attribute of a user who that audio sample is from; and
   identifying, by the device and based on correlations between user attributes of a portion of the different users whose request achieved a particular outcome, a user attribute associated with the particular outcome.

13. The method as in claim 12, wherein the indication of the user attribute is an indication of a geographic location of the user.

14. The method as in claim 12, wherein the indication of the user attribute is an indication of a native language of the user.

15. The method as in claim 12, wherein the indication of the user attribute is an indication of a type of slang language used by the user.

16. The method as in claim 12, wherein the indication of the user attribute is an indication of an age of the user.

17. A tangible, non-transitory, computer-readable medium having computer-executable instructions stored thereon that, when executed by a processor on a computer, cause the computer to perform a method comprising:
   obtaining a plurality of indications of errors experienced by a bot performing tasks, wherein each of the plurality of indications includes contextual information and an audio sample of a user request that the bot failed to recognize of a corresponding error;
   determining correlated errors among the errors experienced by the bot;
   aggregating contextual information of each of the correlated errors into aggregated contextual data; and
   providing the aggregated contextual data with an error notification for a particular correlated error.

18. The tangible, non-transitory, computer-readable medium as in claim 17, wherein the method further comprises:
   identifying, based on the aggregated contextual data for the particular correlated error, a criticality of the particular correlated error.

19. The tangible, non-transitory, computer-readable medium as in claim 17, wherein the method further comprises:
   identifying, based on the aggregated contextual data for the particular correlated error, a remediation technique to prevent future instances of errors of a same type as the particular correlated error.

20. An apparatus, comprising:
   one or more network interfaces to communicate with a network;
   a processor coupled to the one or more network interfaces and configured to execute one or more processes; and
   a memory configured to store a process that is executable by the processor, the process, when executed, configured to:
      obtain a plurality of indications of errors experienced by a bot performing tasks, wherein each of the plurality of indications includes contextual information and an audio sample of a user request that the bot failed to recognize of a corresponding error;

determine correlated errors among the errors experienced by the bot;
aggregate contextual information of each of the correlated errors into aggregated contextual data; and
provide the aggregated contextual data with an error notification for a particular correlated error.

* * * * *